US011228421B1

(12) United States Patent
Mesh et al.

(10) Patent No.: US 11,228,421 B1
(45) Date of Patent: Jan. 18, 2022

(54) SECURE SECRETS TO MITIGATE AGAINST ATTACKS ON CRYPTOGRAPHIC SYSTEMS

(71) Applicant: Apple Inc., Cupertino, CA (US)

(72) Inventors: Arthur Mesh, South San Francisco, CA (US); Jerrold V. Hauck, Windemere, FL (US); Pierre-Olivier J. Martel, Mountain View, CA (US); Wade Benson, San Jose, CA (US); Oren M. Elrad, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 305 days.

(21) Appl. No.: 15/884,263

(22) Filed: Jan. 30, 2018

Related U.S. Application Data

(60) Provisional application No. 62/454,643, filed on Feb. 3, 2017.

(51) Int. Cl.
  *G06F 21/00* (2013.01)
  *H04L 9/00* (2006.01)
  *H04L 9/08* (2006.01)
  *G06F 21/31* (2013.01)
  *G06F 21/56* (2013.01)

(52) U.S. Cl.
  CPC .............. *H04L 9/002* (2013.01); *G06F 21/31* (2013.01); *G06F 21/56* (2013.01); *H04L 9/0863* (2013.01); *H04L 9/0866* (2013.01); *G06F 2221/034* (2013.01)

(58) Field of Classification Search
  CPC ..... H04L 9/002; H04L 9/0863; H04L 9/0866; G06F 21/31; G06F 21/56; G06F 2221/034
  USPC ........................................................ 713/185
  See application file for complete search history.

(56) References Cited

U.S. PATENT DOCUMENTS

| 8,948,386 | B2 | 2/2015 | Campagna et al. | |
|---|---|---|---|---|
| 9,058,497 | B2 | 6/2015 | Bharadwaj et al. | |
| 2008/0189554 | A1* | 8/2008 | Ali | G06F 13/10 713/189 |
| 2011/0099384 | A1* | 4/2011 | Grange | H04L 9/0897 713/184 |
| 2014/0003604 | A1* | 1/2014 | Campagna | H04W 12/0401 380/247 |
| 2014/0108814 | A1* | 4/2014 | Bharadwaj | H04L 9/0836 713/189 |
| 2015/0006601 | A1 | 1/2015 | Aissi et al. | |
| 2016/0119291 | A1* | 4/2016 | Zollinger | H04L 9/3228 713/171 |

(Continued)

FOREIGN PATENT DOCUMENTS

EP 1845468 10/2007

OTHER PUBLICATIONS

Kui Ren; Secret Key Generation Exploiting Channel Characteristics in Wireless Communications: IEEE: 2011; p. 6-12.*

*Primary Examiner* — Monjur Rahim
(74) *Attorney, Agent, or Firm* — Womble Bond Dickinson (US) LLP (57) ABSTRACT

Secure secrets can be used, in one embodiment, to generate a master key. In one embodiment, a first secret value, generated and stored in a first secure element, can be used with a user's credential (e.g., a user's passcode) to generate, through a first key derivation function, a second secret value. A master key can then be generated through a second key derivation function based on the second secret value and a derived or stored secret such as a device's unique identifier.

19 Claims, 7 Drawing Sheets

(56) References Cited

U.S. PATENT DOCUMENTS

2016/0234022 A1 8/2016 Motika et al.
2016/0295404 A1* 10/2016 Gouget ............... H04L 63/0853

* cited by examiner

SECURE SECRETS TO MITIGATE AGAINST ATTACKS ON CRYPTOGRAPHIC SYSTEMS

This application claims the benefit of U.S. Provisional Patent Application No. 62/454,643 filed on Feb. 3, 2017, which is incorporated by reference in its entirety.

BACKGROUND

Modern data processing systems, such as a smartphone or laptop or tablet computer system, often use security measures to protect the integrity of the software that executes on the system and to protect the content of user data such as user files containing text messages, contact or address book information, banking information, and other information. For example, a data processing system can validate code signatures before allowing software to execute and can use passcodes (such as numeric or alphanumeric passcodes) to allow protection of user data through encryption of the user data. In addition, data processing systems can use a set of cryptographic encryption keys in a hierarchy to protect user data such as user files. Data processing systems have also used a separate hardware system, such as a coprocessor with memory in a secure environment or enclave, to perform security functions, such as key management of the keys in the hierarchy of keys.

SUMMARY OF THE DESCRIPTION

The embodiments described herein can improve the security of a data processing system through the use of secure secrets and, in one embodiment, one or more secure elements that use the secure secrets to generate one or more master keys. A method according to one embodiment for providing security for a device can include the following operations: storing a first secret value in a first non-volatile storage device in a secure element, such as a first secure element; receiving a user input that provides a user's credential, such as a user's passcode; generating a second secret value using a first key derivation function (KDF), the first KDF using as inputs at least the first secret value and a value based on the user's credential; generating a master key using a second KDF that uses as inputs at least the second secret value and a derived or stored secret; and using the master key to encrypt or decrypt or derive one or more other keys or perform other operations such as unlocking a device, retrieving or unlocking keybags, making payments, etc. In one embodiment, the method can also include storing the second secret value and a reset token in a key data structure. The method in one embodiment can be performed when the device is booted up from an off state but is not performed when the device is awakened from a sleep or low power state. In one embodiment, the method can include storing a reset token which is received from the first secure element in an encrypted data structure, and obtaining from the encrypted key data structure the reset token in response to a request to reset an authentication counter that counts the number of times that the second secret value is generated. This reset token can then be provided to the first secure element to reset the authentication counter.

In one embodiment, a method for providing security for a data processing system can employ two secure elements, and this can make a hardware attack on one of the secure elements more difficult. A method according to one embodiment which can use two secure elements can include the following operations: storing a first secret value in a first non-volatile storage device coupled to a first processing system within a first secure element, wherein the first secret value is not exposed or available outside of the first secure element; receiving a user input that provides a user's credential; generating, within the first secure element, a second secret value using a first key derivation function, the first key derivation function using as inputs at least values based on the first secret value and the user's credential; passing the second secret value to a second processing system within a second secure element which includes a second non-volatile storage device; storing the second secret value within the second secure element; generating, within the second secure element, a master key using a second KDF that includes as inputs at least the second secret value and a derived or stored secret; using the master key to encrypt or decrypt or derive one or more other keys or perform other operations such as unlocking a device, retrieving or unlocking keybags, making payments, etc.

Other methods which are described herein include the use of an authentication counter and a reset token to limit the amount of time that a first secure element generates a value for use by a second secure element. Further, other methods include the creation of secret values by the first secure element in response to the enrollment of a new user, and other methods include security measures to prevent unauthorized updating of software within the first secure element.

The methods and systems described herein can be implemented by data processing systems, such as one or more smartphones, tablet computers, desktop computers, laptop computers, smart watches, wearable electronic devices, audio accessories, onboard computers, and other data processing systems and other consumer electronic devices. The methods and systems described herein can also be implemented by one or more data processing systems which execute executable computer instructions, stored in one or more non-transitory machine readable media that cause the one or more data processing systems to perform the one or more methods described herein when the program instructions are executed. Thus, the embodiments described herein can include methods, data processing systems, and non-transitory machine readable media.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The embodiments described herein can improve the security of a data processing system through the use of secure secrets and, in one embodiment, one or more secure elements that use the secure secrets to generate one or more master keys that can be used to encrypt or decrypt or derive one or more other keys. In one embodiment, a secure element can generate and store, within the secure element, a secret value that is used with a user's credential to generate another secret value that is used with a key derivation function to generate a master key. A secure element, in one embodiment, includes secure memory that is not accessible to systems outside of the secure element; thus, while a processor within the secure element may be given access to read and use a secret value stored in the secure memory, a processor or other hardware component outside of the secure element cannot get access to that secret value. Thus, a secure element can be considered to be a portion of a data processing system in which one or more secret values can be stored and used without exposing the one or more secret values outside of that portion. Several examples of secure elements are described herein, and in one embodiment, a data processing system can include a plurality of secure elements and an application processing system that interacts with the plurality of secure elements.

Figure 1:
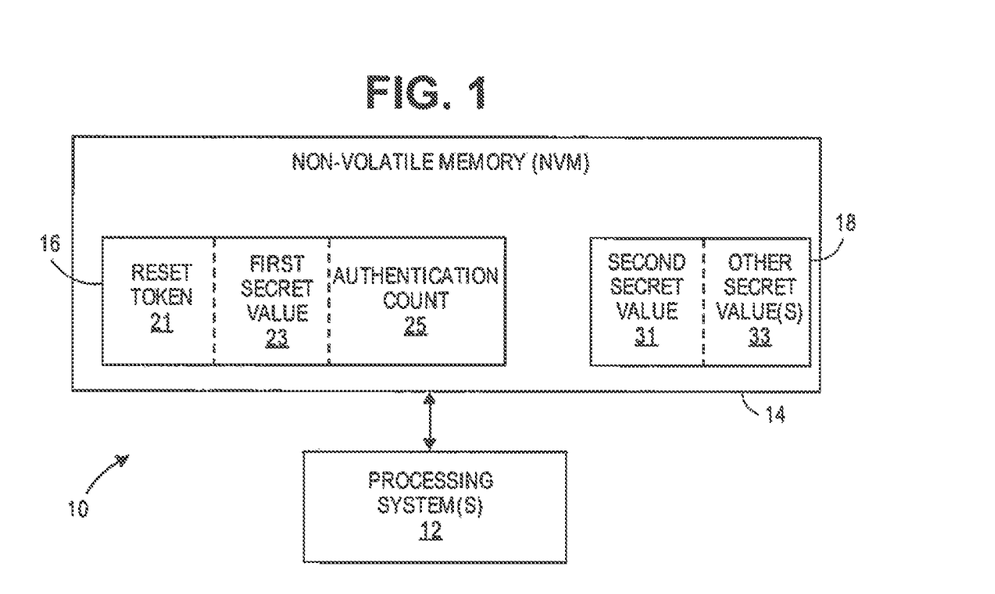
FIG. 1 shows an example of a data processing system which includes one or more secret values stored in non-volatile memory for use in generating a master key according to one or more embodiments described herein.
Figure 5:
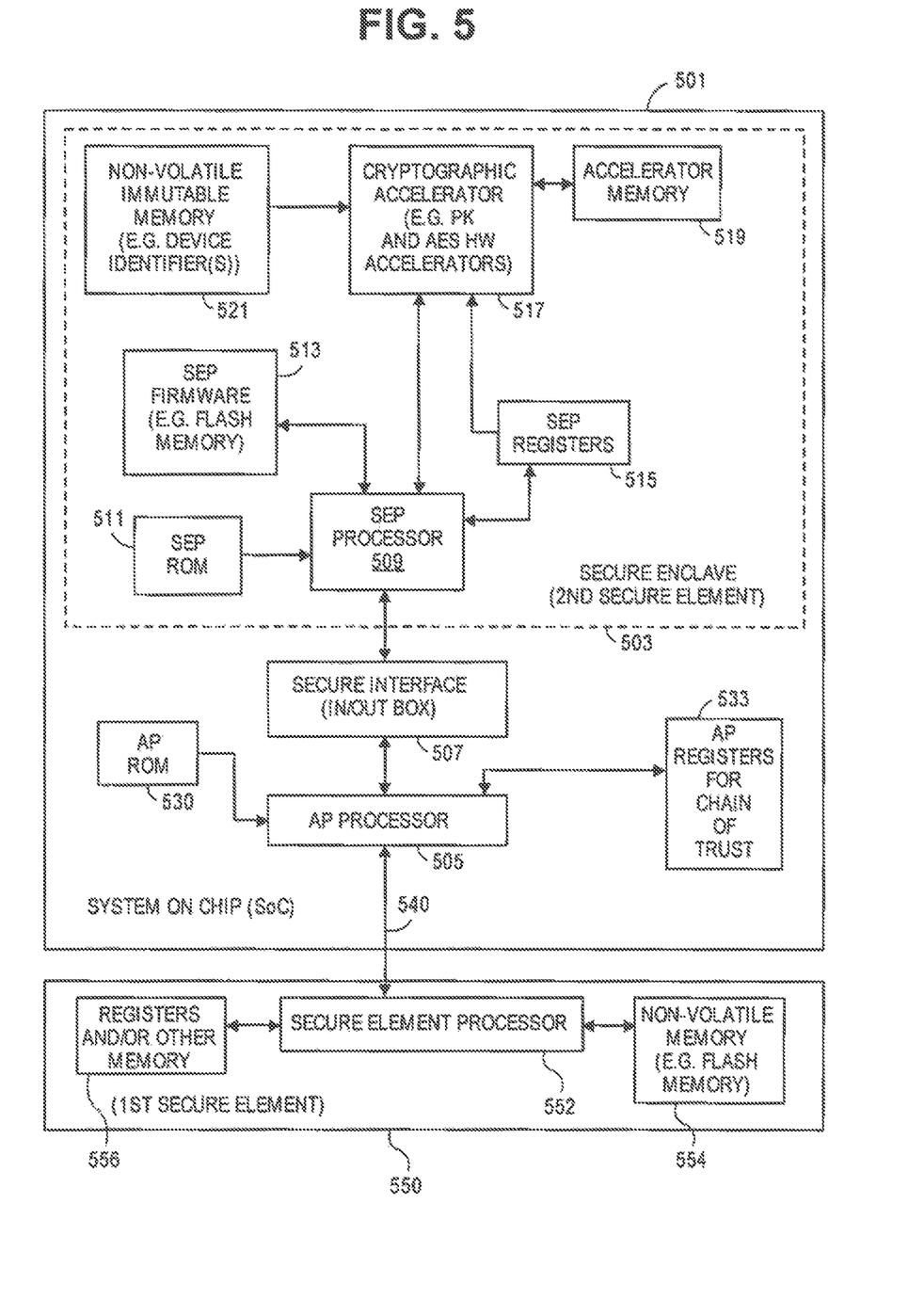
FIG. 5 shows an example of a data processing system which includes two secure elements that are used with an application processing system according to one embodiment described herein.

FIG. 1 shows an embodiment of a data processing system that uses a secret value stored in, for example, a secure element. Referring to FIG. 1, a data processing system 10 includes one or more processing systems 12 and one or more non-volatile memories (NVM) 14. The one or more non-volatile memories 14 can be, in one embodiment, at least two separate non-volatile memories: a non-volatile memory 16 that is part of and within a first secure element and a non-volatile memory 18 that is part of and within a second secure element. The one or more processing systems 12 can be a combination of an application processing system and one or more processing systems in a secure element or two or more secure elements. FIG. 5, described further below, shows a specific example of a data processing system that includes an application processing system and two secure elements (one referred to as a secure element and the other referred to as a secure enclave). The non-volatile memory 16 can include, in one embodiment, at least a first secret value 23; in addition, the non-volatile memory 16 can also include, in certain embodiments, a reset token 21 and an authentication count that can be used by an authentication counter as described in conjunction with FIG. 6. The first secret value 23 can be used, as described further herein, with a user's credential (e.g., a user's entered passcode) to create, through a first key derivation function, a secret value which is in turn used with the second secret value 31 stored in non-volatile memory 18 to create, through a second key derivation function, a master key, such as master key 107 shown in FIG. 2. The non-volatile memory 18 can also include other one or more secret values 33 that can be used by a secure element; these one or more secret values 33 can be one or more of private keys, salts, seed values, etc. The second secret value 31 can be a device's unique identifier or a key generated from the device's unique identifier. In one embodiment, the non-volatile memory 16 can be part of and within NVM 554 in the first secure element 550 in FIG. 5, and the non-volatile memory 18 can be part of and within a non-volatile memory (e.g. memory 521) in the secure enclave 503 (the second secure element in the system of FIG. 5).

Figure 3:
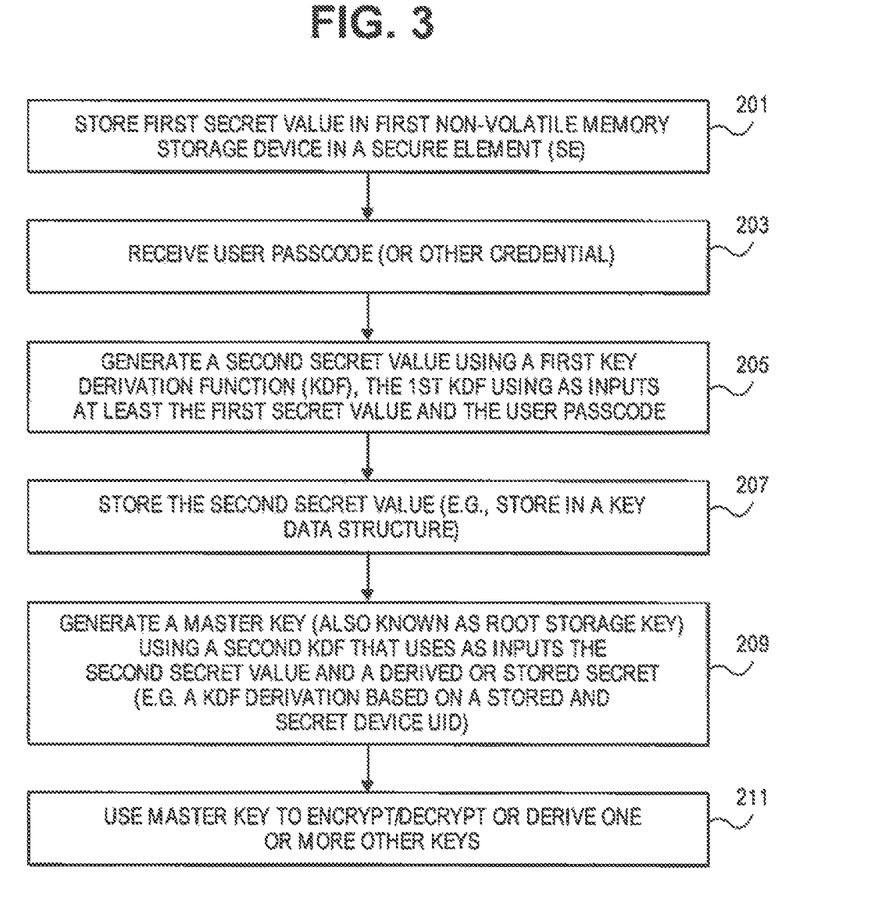
FIG. 3 is a flowchart which illustrates a method according to one embodiment described herein.
Figure 9:
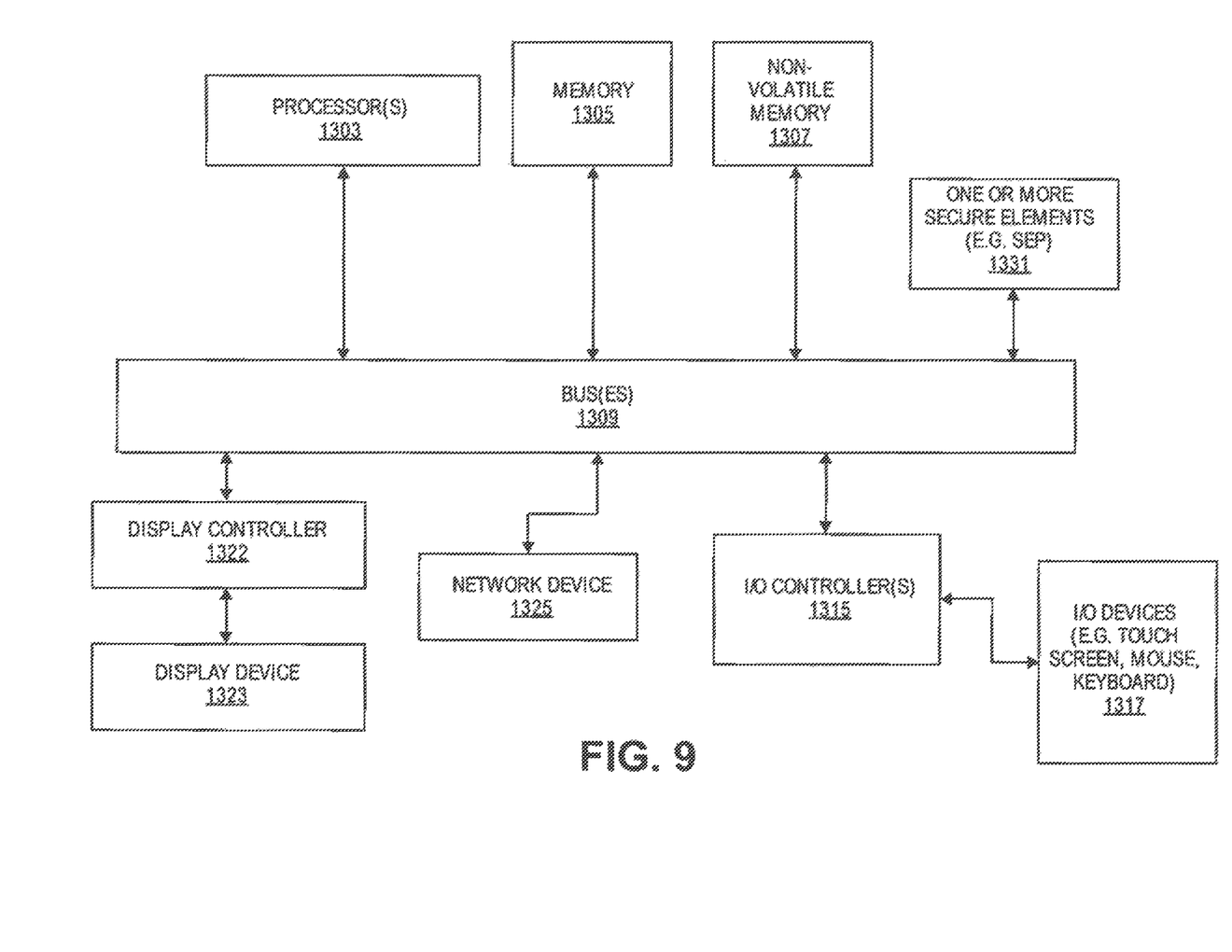
FIG. 9 shows an example of a data processing system which can be used with one or more embodiments described herein.

A method for using at least some of the secret values in FIG. 1 will now be described with reference to FIG. 3. The method shown in FIG. 3 can be performed each time that a data processing system, such as the data processing system 10 shown in FIG. 1 or the data processing system shown in FIG. 5 or FIG. 9, is booted up from an off state; in addition, this method may also be performed each time the system is awakened from a sleep or low power state but in certain embodiments, only portions of the method are performed (in order to avoid awakening the first secure element) when the system is awakened from a sleep or low power state. In operation 201, a first secret value is stored in a non-volatile memory in a secure element (such as, for example, first secure element 550); this first secret value can be first secret value 23 and can be previously generated and stored by the secure element upon enrollment of a user (e.g., a new user), and FIG. 7 shows an example of a method in which this first secret value is generated by using, for example, a random number generator in the secure element. In operation 203, the data processing system receives a user input which provides a user's credentials (e.g. a user's passcode). The user input may be the entry by a user in a virtual numeric keypad on a touchscreen of a passcode or the entry by the user on a keyboard (virtual or real) of a passcode (numeric or alphanumeric). In other embodiments, the user input may be a user's fingerprint or image (e.g. image of user's face or iris, etc.) or other biometric measurement that in effect provides the user's credentials. Then in operation 205, a second secret value is generated using, in one embodiment, a first key derivation function (KDF) that uses, as inputs to the first KDF at least the first secret value (e.g. first secret value 23) and the user's credential (e.g., the user's passcode). This second secret value in one embodiment can be generated by the first secure element which retrieves the first secret value and receives the user's credential and then computes the output of the first KDF. In operation 207 the second secret value computed in operation 205 can be saved (e.g., saved in a key data structure and/or saved in DRAM of a second secure element); in one embodiment, saving the second secret value in DRAM of the second secure element can allow the second secure element to use the second secret value to obtain (e.g. decrypt) a reset token which can be provided to the first secure element to reset an authentication counter as explained below. The second secret value, in one embodiment, can be saved in an encrypted form in the second secure element by, for example, using a key (or a pair of keys) controlled by the second secure element to protect the second secret value while second secret value is stored within the second secure element. In operation 209, a master key is generated through, for example, a second key derivation function that uses an inputs to the second KDF at least the second secret value and a derived or stored secret. In one embodiment, the derived or stored secret can be a device's unique identifier stored in secure memory (e.g. memory 521) within a secure element or can be a key cryptographically derived from the device's unique identifier. In one embodiment, a second secure element (e.g., secure enclave 503) can generate the master key by computing the output of the second KDF within the second secure element. The master key (also sometimes referred to as a root storage key) can then be used in operation 211 to encrypt or decrypt or derive one or more other keys in a key hierarchy using one or more techniques known in the art or perform other operations such as unlocking a device, retrieving or unlocking keybags, making payments, etc. The method shown in FIG. 3 can be performed with two secure elements in one embodiment, and in an alternative embodiment can be performed with one secure element.

Figure 2:
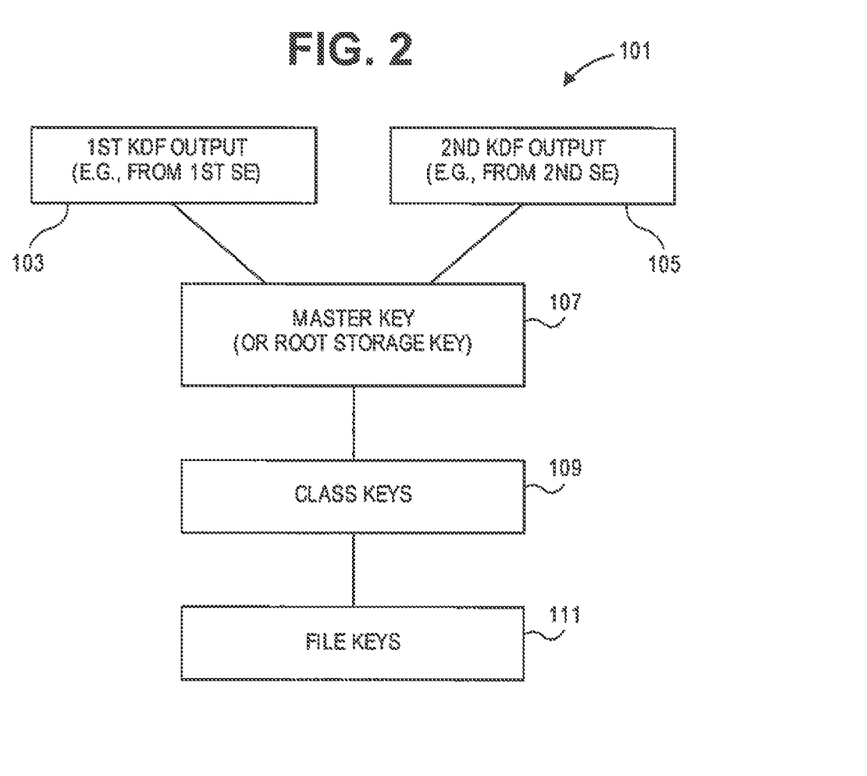
FIG. 2 shows an example of a key hierarchy which can be used in one or more embodiments described herein.

FIG. 2 shows an example of a key hierarchy 101 that can be used in one or more embodiments described herein. The key hierarchy 101 uses a master key 107 to wrap (encrypt) a set of class keys 109 which in turn wrap (encrypt) a set of file keys 111. In one embodiment, each file can have its own file key that is encrypted by a class key. The file is encrypted by the file key, and can be decrypted by the file key after the class key is used to obtain the file key by decrypting the encrypted file key. The master key 107 can be derived, in one embodiment, using operation 209 in FIG. 3 or using operation 311 in FIG. 4 in another embodiment, As shown in FIG. 2, the master key 107 can be derived through a key deprivation function (e.g. the second KDF used in operation 311) that uses as inputs to that KDF at least the output 103 and the output 105. That KDF may also use additional inputs such as a seed or other cryptographically generated value. The output 103 is, in one embodiment, the output of the first KDF in operation 205 in FIG. 3, and in another embodiment, the output 103 is the output of the first KDF in operation 35 in FIG. 4. Thus, the output 103, in one embodiment, is based on both a secret value stored in a secure memory in a secure element and a user's credential (e.g., user's passcode) that was entered by a user to unlock the device. The output 105, in one embodiment, can be a value obtained from a KDF that uses as an input at least a device's unique identifier that is stored in a secure memory in a secure element, such as a second secure element (e.g. secure enclave 503). The master key 107, once generated, can be used to decrypt the one or more class keys 109, and those one or more class keys 109 can be used to decrypt one or more file keys. The key hierarchy 101 can be used, for example, on iOS devices such as iPhones and iPads from Apple Inc. of Cupertino, Calif.

Figure 4:
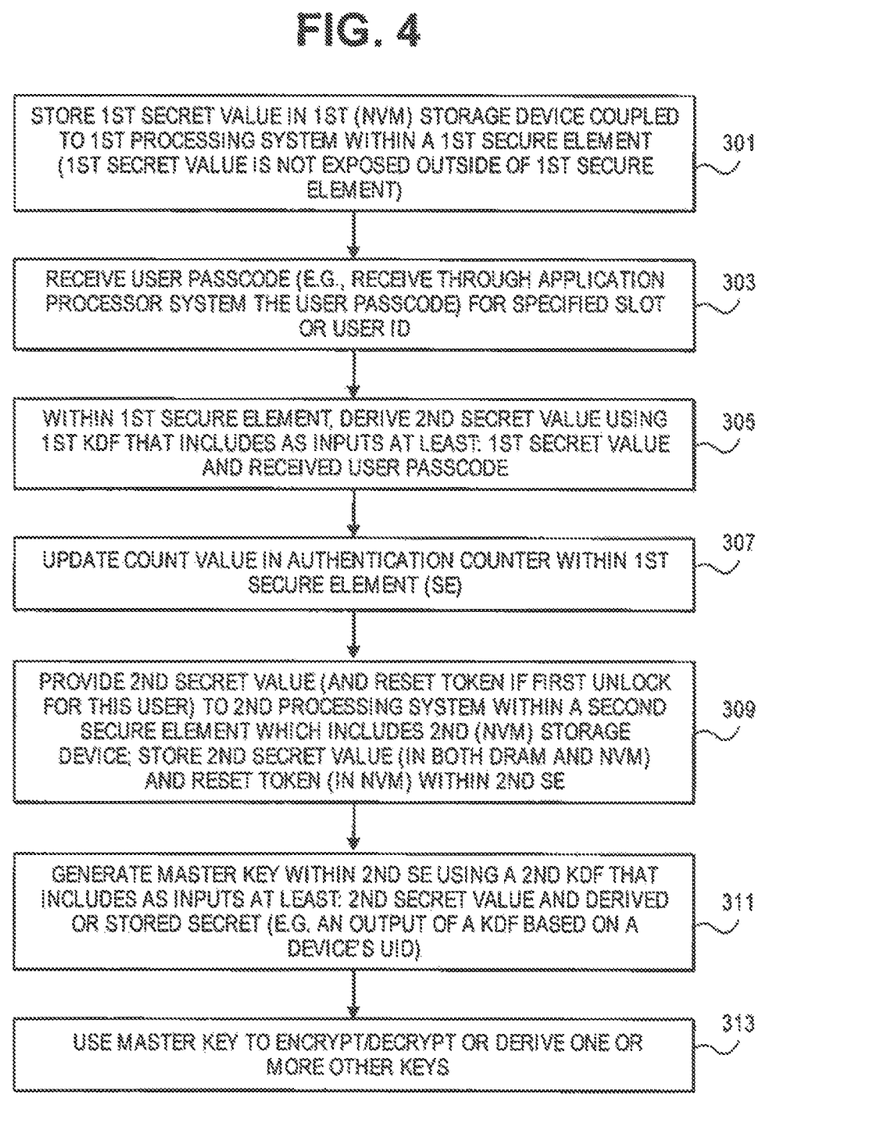
FIG. 4 is a flowchart which illustrates another method according to one embodiment described herein.

A method which can use two secure elements and at least some of the secret values shown in FIG. 1 will now be described with reference to FIG. 4. The method shown in FIG. 4 can be performed each time that a data processing, such as the data processing system 10 shown in FIG. 1 or the data processing system shown in FIG. 5 or FIG. 9, is booted up from an off state; in addition, this method may also be performed each time the system is awakened from a sleep or low power state but in certain embodiments, only portions of the method are performed (in order to avoid awakening the first secure element or writing to the non-volatile memory in the first secure element) when the system is awakened from a sleep or low power state. In operation 301, a first secure element 550 stores a first secret value, such as first secret value 23 in a non-volatile memory storage device which is coupled to a first processing system within the first secure element. In one embodiment, the first secret value is stored in secure memory which is not exposed or accessible outside of the first secure element. In operation 303, the first secure element receives a user passcode for a specified slot or user ID. In one embodiment, the first secure element can implement a set of slots, each designated for a particular user of a device, and each slot can include storage for a set of values which can include a first secret value for that user as well as a reset token for that user and an authentication count for that user and other possible values. In operation 305, the first secure element derives a second secret value using a first KDF that includes as inputs to the KDF at least values based on the first secret value and the received user passcode which was received in operation 303. In one embodiment, the application processing system can receive the user input and provide the user passcode to the first secure element so that the first secure element can use the user passcode (or a value based on the user passcode) in the first KDF to generate the second secret value. In operation 307, the first secure element can update the count value, such as authentication count 25 which is used with an authentication counter as described further below. In operation 309, the first secure element can provide the second secret value derived in operation 305 to a second secure element, such as secure enclave 503. In one embodiment, the reset token 21 can also be provided to the second secure element if this is the first unlock for this particular user so that the second secure element can retrieve the reset token for use with the method shown in FIG. 6 which is described further below. In one embodiment, the first secure element in operation 309 can pass the second secret value through an application processing system using an encrypted transmission which encrypts the second secret value for passage through the application processing system and receipt by the second secure element which can then decrypt the encrypted second secret value. In one embodiment, the second secret value can be stored within the second secure element in both the DRAM of the second secure element and also a non-volatile memory of the second secure element. The reset token can also be stored in non-volatile memory within the second secure element according to one embodiment described herein. In operation 311, the second secure element generates a master key, such as master key 107 using a second key derivation function that includes as inputs to that function at least: the second secret value and a derived or stored secret, such as an output of a key derivation function that is based on a unique identifier for a device, such as a device's UID. Then in operation 313, the master key can be used by, for example, the second secure element to encrypt or decrypt or derive one or more other keys used in cryptographic operations.

FIG. 5 shows an example of a system on-chip (SOC) 501 which can be used in the one or more embodiments described herein. As is known in the art, a system on-chip can include one or more processors and memory controllers and other components on a single integrated circuit. External memory such as DRAM and mass storage (e.g. flash memory) are external to the SOC. In the example shown in FIG. 5, the SOC 501 includes an application processor 505 and a secure enclave 503 which is coupled to the application processor 505 through a secure interface 507 which can include an in-box and an out-box. The secure enclave 503 can be the second secure element in the method of FIG. 4, and the secure element 550 can be the first secure element in the method of FIG. 4. The application processor 505 can be one or more processors that execute an application processor operating system (e.g. iOS from Apple Inc.) and the user programs (e.g. applications or "apps" that run on the iOS operating system) in order to provide access to user data which can be one or more user files that are manipulated, created or otherwise used by the user programs under the direction of the user of the user programs. The SEP processor 509 can be a dedicated cryptographic processor that performs the various security functions described herein including validating code signatures, processing of passcodes, the creation or generation of cryptographic keys, the encryption of keys, the decryption of keys, enable or disable changes of security settings or policies, and the encryption and decryption of one or more user files. The SEP processor 509, in one embodiment, can perform at least a portion of the operations in the methods shown in FIG. 4, as well as other methods described herein, and the SEP processor 509 can perform one or more of these operations (such as operations 309, 311 and 313) by executing the firmware 513 which causes these operations to be performed. The SEP ROM 511 can store executable code which is immutable but readable in order to boot up the SEP processor 509. The executable code in ROM 511 can be trusted software that can validate the software in firmware 513 before allowing that firmware to execute by checking a code signature of the firmware and verifying that the code signature indicates that firmware is valid and has not been corrupted before allowing the firmware to be executed by the SEP processor 509. The executable code in ROM 511 can be created in the factory that creates the SOC 501. The SEP processor 509 can continue the process of checking code signatures of successively higher layers of software, up to the user programs that execute on AP processor 505. In one embodiment, the SEP registers 515 can be coupled to both the SEP processor 509 and to the cryptographic accelerator 517. The cryptographic accelerator 517 can use non-volatile immutable memory 521 which can store one or more device identifiers, such as universally unique device identifiers for the particular device which are fused into the SOC at the time of manufacture so that the device identifier is non-volatile and immutable. This device identifier can be used to create the output 105 in FIG. 2 in one embodiment. In addition, other cryptographic parameters can be stored in the non-volatile immutable memory 521 and used by the cryptographic accelerator 517. In one embodiment, the cryptographic accelerator can also include accelerator memory 519 which can be similar to scratchpad memory which is used to perform the cryptographic operations that are accelerated by the cryptographic accelerator 517. These operations can include public key cryptographic (asymmetric) operations as well as symmetric key operations, such as AES acceleration using the hardware accelerator modules provided by the cryptographic accelerator 517.

In one embodiment, the application processor 505 can be coupled to an application processor ROM 530 that provides software that boots up the application processor 505, and the application processor 505 can be coupled to AP registers 533 that can store data for a chain of trust of the operating system software of the application processor 505 (up to and including the kernel of the operating system). The data for the chain of trust can be a collection of hashes of all of the software components in the operating system, and this data can be examined by the SEP processor 509 to validate the code signatures for the operating system software of the application processor 505. Further information about embodiments of secure enclave processors can be found in U.S. Provisional Patent Application No. 62/276,913 filed Jan. 10, 2016 and 62/171,705 filed Jun. 5, 2015, and both of these U.S. provisional patent applications are incorporated herein by reference. Embodiments of an SEP are also described in U.S. Patent Application Publication No. US 2014/0089682 A1 which is also incorporated herein by reference.

The first secure element 550 can include several components such as a secure element processor 552, a non-volatile memory 554, which in one embodiment can be flash memory, and registers 556 (which can include other memory such as volatile DRAM). The first secure element can also, in one embodiment, include other components (not shown) depending on its use; for example, the first secure element may include a near field communication system used to make electronic payments (such as electronic payments through Apple Pay). The secure element processor 552 can, in one embodiment, be coupled to the application processor (s) 505 through a bus 540 such as a serial peripheral interface bus (e.g. UART). The secure element processor 552, in one embodiment, can be configured to perform the operations of the first secure element as described herein such as operations 201 and 205 of FIG. 3 and operations 301, 303, 35, 307 and 309 of FIG. 4 (as well as some of the operations in FIGS. 6, 7, and 8). In one embodiment, the secure element processor 552 can be configured by executable software stored in the non-volatile memory 554 to perform these (and other) operations and to communicate with the AP processor(s) 505 through the bus 540. The non-volatile memory 554 can also, in one embodiment, store the first secret value 23 and the reset token 21 and the authentication count 25; in one embodiment, the non-volatile memory 554 can be secure memory that stores values that are not accessible from outside of the first secure element. In one embodiment, the first secure element can use two NVMs, one as secure memory for data such as the first secret value 23, the reset token 21 and the authentication count 25 and another NVM to store software which can be updatable. In one embodiment, the NVM 554 can be flash memory that may or may not use wear leveling. The register 556 can be temporary scratchpad memory that is used by the secure element processor 552.

In one embodiment, the secure element processor 552 can communicate with the AP processor(s) 505 through bus 540 using an encrypted and secure communication protocol (e.g. using techniques known in the art to, for example, establish session keys, etc.) so that data transmitted through bus 540 is encrypted and is not in clear text (e.g. the second secret value passed to the secure enclave 503 through the AP processor is encrypted by the protocol). The protocol can allow an end-to-end path (between the two secure elements with the AP processor(s) in the middle) that encrypts the data while in transit and can be decrypted by the receiving secure element.

Figure 6:
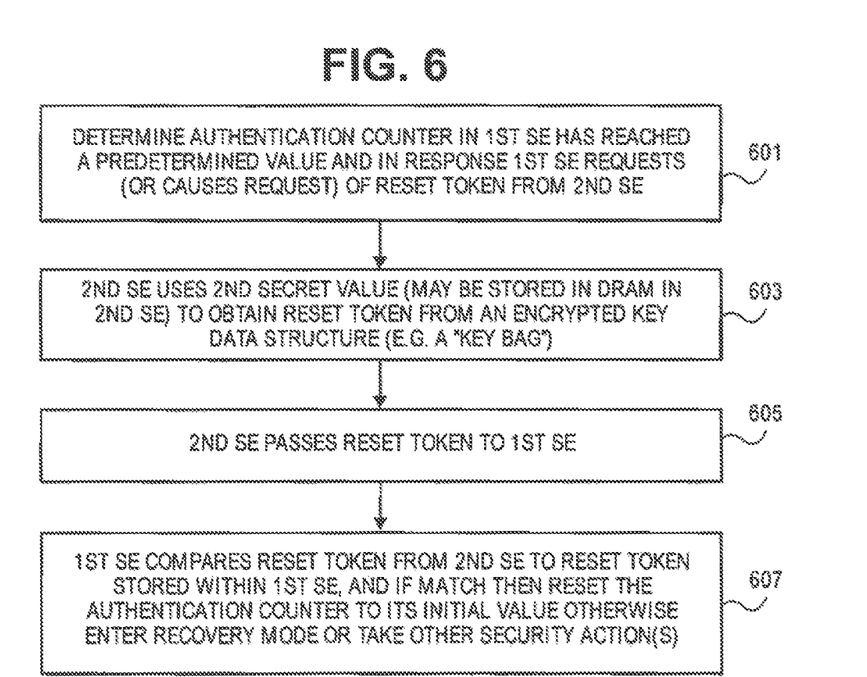
FIG. 6 is a flowchart which illustrates a method according to one embodiment described herein in connection with the use of an authentication counter.
Figure 7:
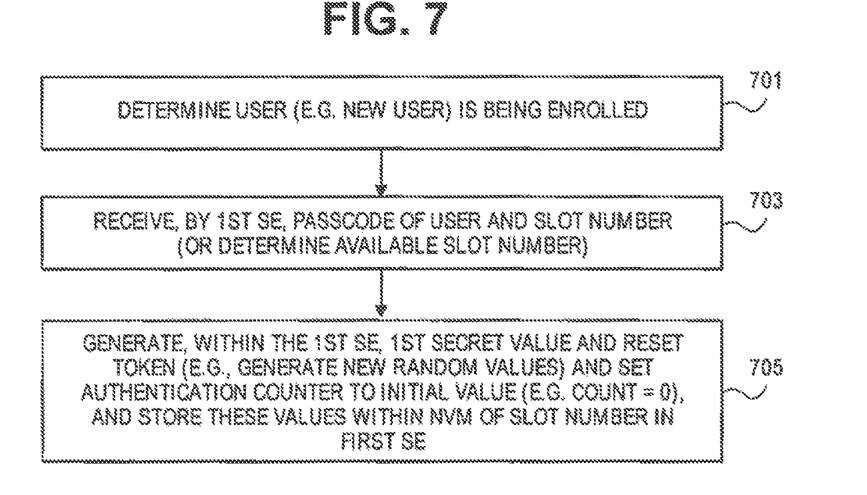
FIG. 7 is a flowchart which illustrates a method according to one embodiment for enrolling a user according to one embodiment.

FIG. 6 shows a method according to one embodiment in which two secure elements use a reset token with an authentication counter which can limit the number of times that the first secure element uses the first secret value, such as first secret value 23, to generate a second secret value that is in turn used to generate the master key, such as master key 107. In effect, the authentication counter within the first secure element requires the second secure element to authenticate itself to the first secure element after the authentication counter reaches a predetermined number (e.g. N). In one embodiment, the authentication counter can begin with an initial value such as zero and count up to a predetermined value such as, for example 10 or 20 or other values. In those embodiments in which wakeups from sleep do not use the first secure element to generate the second secret value, then the counts in the authentication count will be for only those instances in which the first secure element generates the second secret value in response to booting up the device from an off state. In operation 601, the first secure element can determine that the authentication counter in the first secure element has reached the predetermined value and in response the first secure element can request (or cause the request of) the reset token for the particular slot or user. In one embodiment, the reset token will have been previously provided to the second secure element and stored in an encrypted key data structure, and the second secret value can be used to retrieve the reset token stored within the second secure element. Thus, in operation 603, the second secure element can use the second secret value, which may be stored in DRAM in the second secure element to obtain the reset token from non-volatile storage within the second secure element, and that non-volatile storage may store an encrypted key data structure that contains the reset token. In operation 605, the second secure element then passes the reset token obtained in operation 603 to the first secure element. Then in operation 607, the first secure element can compare the reset token from the second secure element to the reset token stored within the first secure element, and if there is a match between the reset token values then the authentication counter within the first secure element is reset to its initial value. If the reset token values do not match, then the first secure element can take one of a variety of security actions such as refusing to reset the authentication count or causing the system to enter into recovery mode, etc. In one embodiment, the method shown in FIG. 6 can be activated when the first secure element reaches the Nth value in the count, where N represents the predetermined number or value that requires the reset of the authentication counter. In other words, when the second secret value has been derived from the Nth time, then the method shown in FIG. 6 can be immediately activated so that the authentication counter can be reset before the next time that the second secret value is required to be derived such as when the device begins the next boot up from an off state.

FIG. 7 shows an example of a method which can be performed when a new user is enrolled. In one embodiment, this can involve allocating a new slot for storage of security information for the new user within the first secure element. Thus in effect the method shown in FIG. 7 allocates a new slot and generates the values for the slot. In operation 701, the application processing system can be determine that a new user is being enrolled. In operation 703, the first secure element can receive the passcode of the user and a slot number for that user or otherwise determine an available slot number. Then in operation 705, the first secure element can generate, within the first secure element the first secret value for that slot as well as a reset token and can set the authentication counter to an initial value and then store these values within non-volatile memory of the slot number in the first secure element. In one embodiment, the first secret value and the reset token can be random values which are generated by a random number generator within the first secure element. Once these values are stored within the slot for the particular user, they can be used in the methods described herein, such as the methods shown in FIG. 3 or 4. It will be appreciated that in one embodiment the application processing system and/or the first secure element may maintain an association between a user identifier (which identifies the particular user) and a corresponding slot number for that user in which the values for that user are stored. In addition to the values generated in operation 705, other additional optional values may also be generated and stored and can include values such as a salt value, etc.

Figure 8:
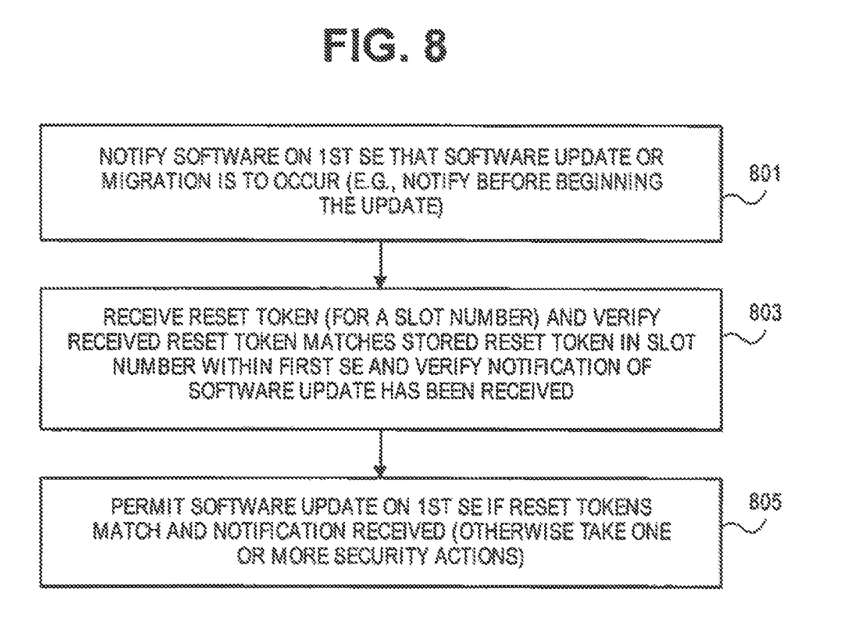
FIG. 8 is a flowchart which illustrates a method for allowing a software update of a secure element according to one embodiment described herein.

FIG. 8 shows an example according to one embodiment for verifying that a software update for the first secure element is proper. In operation 801, the first secure element receives a notification, such as a notification from the application processing system, that a software update or migration is to occur for the software within the first secure element. Then in operation 803, the first secure element receives a reset token for a particular slot number of the user currently using the device, and the device verifies that the received reset token matches the stored reset token in the slot number within the first secure element. In one embodiment, the reset token is received from the application processing system which can request that the reset token from the second element in response to determining that a software update on the first secure element is about to occur. Also in operation 803, the first secure element verifies that the notification of the software update has been received. Then in operation 805 the first secure element can permit the software update on the first element if the reset tokens match and the notification has been received. In one embodiment, if the reset tokens do not match or the notification has not been received then the first secure element may take one or more security actions including, for example, causing the device to enter into a recovery mode.

The data processing systems described herein can also perform conventional recovery techniques if the first secure element fails by recovering the second secret value from a key data structure stored within non-volatile memory of the second secure element.

The systems and methods described herein can be implemented in a variety of different data processing systems and devices, including general-purpose computer systems, special purpose computer systems, or a hybrid of general purpose and special purpose computer systems. Exemplary data processing systems that can use any one of the methods described herein include desktop computers, laptop computers, tablet computers, smart phones, cellular telephones, personal digital assistants (PDAs), embedded electronic devices, or consumer electronic devices.

FIG. 9 is a block diagram of data processing system hardware according to an embodiment. Note that while FIG. 9 illustrates the various components of a data processing system that may be incorporated into a mobile or handheld device, it is not intended to represent any particular architecture or manner of interconnecting the components as such details are not germane to the present invention. It will also be appreciated that other types of data processing systems that have fewer components than shown or more components than shown in FIG. 9 can also be used with the present invention.

As shown in FIG. 9, the data processing system includes one or more buses 1309 that serve to interconnect the various components of the system. One or more processors 1303 are coupled to the one or more buses 1309 as is known in the art. In one embodiment, the one or more processors 1303 can be the SOC 501 shown in FIG. 5. Memory 1305 may be DRAM or non-volatile RAM or may be flash memory or other types of memory or a combination of such memory devices. This memory is coupled to the one or more buses 1309 using techniques known in the art. The data processing system can also include non-volatile memory 1307, which may be a hard disk drive or a flash memory or a magnetic optical drive or magnetic memory or an optical drive or other types of memory systems that maintain data even after power is removed from the system. The non-volatile memory 1307 and the memory 1305 are both coupled to the one or more buses 1309 using known interfaces and connection techniques. One or more secure elements 1331 can also be coupled to the system shown in FIG. 9 through one or more buses; the one or more secure elements can include one or both of secure element 550 and secure enclave 503 (if the one or more processors 1303 does not include a secure enclave). A display controller 1322 is coupled to the one or more buses 1309 in order to receive display data to be displayed on a display device 1323. The display device 1323 can include an integrated touch input to provide a touch screen. The data processing system can also include one or more input/output (I/O) controllers 1315 which provide interfaces for one or more I/O devices, such as one or more mice, touch screens, touch pads, joysticks, and other input devices including those known in the art and output devices (e.g. speakers). The input/output devices 1317 are coupled through one or more I/O controllers 1315 as is known in the art.

While FIG. 9 shows that the non-volatile memory 1307 and the memory 1305 are coupled to the one or more buses directly rather than through a network interface, it will be appreciated that the present invention can utilize non-volatile memory that is remote from the system, such as a network storage device which is coupled to the data processing system through a network interface such as a modem or Ethernet interface. The buses 1309 can be connected to each other through various bridges, controllers and/or adapters as is well known in the art. In one embodiment the I/O controller 1315 includes one or more of a USB (Universal Serial Bus) adapter for controlling USB peripherals, an IEEE 1394 controller for IEEE 1394 compliant peripherals, or a Thunderbolt controller for controlling Thunderbolt peripherals. In one embodiment, one or more network device(s) 1325 can be coupled to the bus(es) 1309. The network device(s) 1325 can be wired network devices (e.g., Ethernet) or wireless network devices (e.g., cellular telephone, WI-FI, Bluetooth).

It will be apparent from this description that aspects of the present invention may be embodied, at least in part, in software. That is, the techniques may be carried out in a data processing system in response to its processor executing a sequence of instructions contained in a storage medium, such as a non-transitory machine-readable storage medium (e.g. DRAM or flash memory). In various embodiments, hardwired circuitry may be used in combination with software instructions to implement the present invention. Thus the techniques are not limited to any specific combination of hardware circuitry and software, or to any particular source for the instructions executed by the data processing system. Moreover, it will be understood that where mobile or handheld devices are described, the description encompasses mobile devices (e.g., laptop devices, tablet devices), handheld devices (e.g., smartphones), as well as embedded systems suitable for use in wearable electronic devices.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A method for providing security for a device, the method comprising:
storing a first secret value in a first non-volatile storage device in a first secure element;
receiving, with the device, a user input that provides a user's credential;
generating, with the device, a second secret value using a first key derivation function (KDF), the first KDF using as inputs at least values based on the first secret value and the user's credential;
generating, with the device, a master key using a second KDF that uses as inputs at least the second secret value and a derived or stored secret, wherein the derived or stored secret is a key derived from the device's unique identifier (UID) stored in a secure memory device; and
using the master key to encrypt or decrypt or derive one or more other keys.

2. The method of claim 1 further comprising:
storing the second secret value and a reset token in a key data structure.

3. The method of claim 2 wherein the user's credential comprises at least one of: (a) a user's passcode; (b) a user's fingerprint; (c) an image or (d) a biometric measurement; and wherein the passcode is one of a numeric code or an alphanumeric code.

4. The method of claim 1 wherein the method is performed when the device is booted up from an off state but is not performed when the device is awakened from a sleep or low power state.

5. The method of claim 1, the method further comprising:
storing the second secret value;
storing a reset token received from the first secure element in an encrypted key data structure;
obtaining from the encrypted key data structure the reset token in response to a request to reset an authentication counter that counts the number of times that the second secret value is generated; and
providing the reset token, obtained from the encrypted key data structure, to the first secure element to reset the authentication counter.

6. The method of claim 5 wherein the encrypted key data structure stores a collection of class keys for different classes of data or different levels of security.

7. The method of claim 1 wherein the first non-volatile storage device is a flash memory device that operates without wear leveling.

8. A non-transitory machine readable medium storing executable instructions which when executed by a device cause the device to perform a method comprising:
storing a first secret value in a first non-volatile storage device coupled to a first processing system within a first secure element in the device, wherein the first secret value is not exposed or available outside of the first secure element;

receiving, with the device, a user input that provides a user's credential;

generating, within the first secure element of the device, a second secret value using a first key derivation function (KDF), the first KDF using as inputs at least values based on the first secret value and the user's credential;

passing the second secret value to a second processing system within a second secure element in the device, the second secure element, which includes a second non-volatile storage device, wherein the second secure element is different than the first secure element;

storing the second secret value within the second secure element;

generating, within the second secure element of the device, a master key using a second KDF that includes as inputs at least the second secret value and a derived or stored secret, wherein the derived or stored secret is a key derived from the device's unique identifier (UID); and using the master key to encrypt or decrypt or derive one or more other keys.

9. The medium of claim 8, wherein the method further comprises:
storing the second secret value and a reset token in a key data structure in the second non-volatile storage device; and wherein the reset token is received by the second secure element from the first secure element.

10. The medium of claim 9 wherein the user's credential comprises at least one of: (a) a user's passcode; (b) a user's fingerprint; (c) an image; or (d) a biometric measurement and wherein the passcode is one of a numeric code or an alphanumeric code.

11. The medium of claim 10 wherein the second secret value and the reset token are passed from the first secure element through an application processing system to the second secure element.

12. The medium of claim 8, wherein the method further comprises:
updating, in response to generating the second secret value, a count value in an authentication counter within the first secure element.

13. The medium of claim 12, wherein the method further comprises:
storing a reset token, received from the first secure element, in an encrypted key data structure in the second non-volatile storage device;
obtaining from the encrypted key data structure the reset token in response to a request to reset an authentication counter that counts the number of times that the second secret value has been generated since a last rest of the authentication counter; and
providing the reset token, obtained from the encrypted data structure, to the first secure element to reset the authentication counter.

14. The medium of claim 13 wherein the encrypted key data structure stores a collection of class keys for different classes of data or different levels of security.

15. The medium of claim 8 wherein the generating and the passing of the second secret value are performed when the device is booted up from an off state but are not performed when the device is awakened from a sleep or lower power state.

16. A data processing system comprising:
an application processing system which includes a set of one or more application processors and application processing system data storage coupled to the set of one or more application processors which is configured to receive a user input that provides a user's credentials;
a first secure element coupled to the application processing system, the first secure element including a first processing system and first non-volatile data storage coupled to the first processing system, the first non-volatile data storage storing a first secret value, and the first processing system is configured to generate a second secret value in response to a request from the application processing system and receipt of the user's credentials, the second secret value being based on the user's credentials and the first secret, and the first processing system is configured to pass the generated second secret value to the application processing system; and
a second secure element coupled to the application processing system, the second secure element including a second processing system and second non-volatile storage coupled to the second processing system, the second non-volatile storage storing third secret value, and the second processing system is configured to receive the second secret value and to generate a master key based on at least (1) the second secret value and (2) the third secret value or a derivation based on the third secret value, wherein the third secret value or a derivation based on the third secret value is a key derived from the device's unique identifier (UID).

17. The system as in claim 16 wherein the master key is used to encrypt or decrypt or derive one or more other keys or unlock a device or retrieve a keybag or unlock a keybag or make a payment; and wherein the user's credential comprises at least one of: (a) a user's passcode; (b) a user's fingerprint; or (c) an image; and wherein the passcode is one of a numeric code or an alphanumeric code.

18. The system as in claim 17 wherein the second secret value is generated using a first key derivation function and the master key is generated using a second key derivation function and wherein the third secret value is based on a unique device identifier.

19. The system as in claim 18 wherein the second secure element resets an authentication counter in the first secure element when the authentication counter reaches a predetermined value.

\* \* \* \* \*